United States Patent
Touzet et al.

(10) Patent No.: US 12,199,475 B2
(45) Date of Patent: Jan. 14, 2025

(54) ROTOR FOR ELECTRICAL MACHINES WOUND WITH OXIDIZED ALUMINIUM STRIP

(71) Applicant: THALES, Courbevoie (FR)

(72) Inventors: Eric Touzet, Chatou (FR); Fabrice Germain, Chatou (FR); Mathieu Bouton, Chatou (FR); Rémi Louviot, Chatou (FR); Philippe Dumont, Chatou (FR); Sébastien Strim, Chatou (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 18/076,298

(22) Filed: Dec. 6, 2022

(65) Prior Publication Data
US 2023/0187989 A1    Jun. 15, 2023

(30) Foreign Application Priority Data
Dec. 15, 2021   (FR) ........................................ 2113561

(51) Int. Cl.
*H02K 1/32*   (2006.01)
(52) U.S. Cl.
CPC .................... *H02K 1/325* (2013.01)
(58) Field of Classification Search
CPC ........ H02K 1/325; H02K 3/487; H02K 9/197; H02K 3/02
See application file for complete search history.

(56) References Cited

U.S. PATENT DOCUMENTS 4,409,502 A * 10/1983 McCabria ................ H02K 3/24
310/214
2008/0252155 A1 * 10/2008 Waddell .................. H02K 1/325
310/58
2016/0204663 A1   7/2016 Huang et al.
2016/0344269 A1  11/2016 Yabe et al.
2017/0346358 A1 * 11/2017 Fukuda .................. H01R 4/022
2019/0162168 A1 *  5/2019 Röer ...................... H02K 3/527

FOREIGN PATENT DOCUMENTS

| DE | 23 03 041 A1 | 7/1974 | |
| DE | 2826607 A1 * | 11/1979 | ............... H02K 3/52 |
| DE | 10 2009 008 405 A1 | 8/2010 | |
| EP | 3 509 193 A1 | 7/2019 | |
| GB | 1 046 145 A | 10/1966 | |
| JP | S57-135649 A | 8/1982 | |

OTHER PUBLICATIONS

DE2826607A1_translate (Year: 1979).*

* cited by examiner

*Primary Examiner* — Tulsidas C Patel
*Assistant Examiner* — Mohammed Ahmed Qureshi
(74) *Attorney, Agent, or Firm* — BakerHostetler

(57) ABSTRACT

A rotor of a rotating electrical machine includes a plurality of poles each extending on a first axis that is radial with respect to the rotor and on a second axis parallel to the rotor with respect to the rotor, each pole comprising a pole body, a rotor winding for each pole, positioned against the body of the pole, the rotor winding taking the form of a strip extending over the length of the pole body on the radial first axis wound against the pole body, a plurality of closure shims, a closure shim of the plurality of closure shims being in contact with a rotor winding associated with a pole body, the closure shim being configured to exert a pressure on the rotor winding towards the pole body.

5 Claims, 3 Drawing Sheets

ROTOR FOR ELECTRICAL MACHINES WOUND WITH OXIDIZED ALUMINIUM STRIP

CROSS-REFERENCE TO RELATED APPLICATION

This application claims priority to foreign French patent application No. FR 2113561, filed on Dec. 15, 2021, the disclosure of which is incorporated by reference in its entirety.

FIELD OF THE INVENTION

The invention relates to the field of the winding of rotors and, more particularly, the winding of the multi-pole rotors comprising four poles. More specifically, the invention deals with a winding of conductors in an innovative material that allows for a weight saving. This weight saving problem is of particular interest for the field of airborne rotating electrical machines in which the weight is a real issue. Nevertheless, the invention can be applicable in any field of rotating electrical machines in which the saving of weight of the machine is targeted. The invention also deals with a device for cooling the winding of the rotors according to the invention that enhances the heat extraction from the winding of the rotors.

BACKGROUND

Rotating electrical machines generally comprise a stator and a rotor that are electromagnetically coupled, the rotor being driven in rotation via the immobile stator. The rotor can comprise one or more poles extending radially with respect to the rotor and can comprise one or more coil windings mounted on the rotor pole.

Coil windings made of copper are commonly used in the rotors of synchronous electrical machines. In fact, the physical characteristics of copper, and in particular its low electrical resistance, make it an excellent electrical conductor in the case of electrical induction of a rotating electrical machine. Consequently, the copper windings take the form of thin copper wires wound around each pole so as to generate turns.

Nevertheless, the current weight of the conductors made of enamelled copper wires is detrimental for rotors with high-speed salient poles. Indeed, the rotors wound with copper wire limit, through their weight, the rotor speeds, thus limiting the electrical performance levels of the alternators and motors. Now, for airborne electrical machines, increasing the weight to increase the power is costly and problematical, since this weight increase limits the rotation speed, nevertheless making it possible to optimize the efficiency.

Furthermore, the electrical resistance of the copper windings (although low by conventional measures) is sufficient to contribute to a substantial overheating of the rotor and reduce the energy efficiency of the machine. Now, seeking to lighten the windings around the poles to induce an increase in the rotation speed of the rotor and therefore an increase in the electrical induction also leads to an increase in the heating undergone by the winding.

SUMMARY OF THE INVENTION

The invention aims to wholly or partly overcome the problems cited above by proposing to replace the copper winding with an oxidized aluminium strip that makes it possible to lighten the pole and therefore the rotor and have a better filling of the pole through the absence of space between each layer of the conductor. Furthermore, the heat exchange surface between turns is greater with strip, comprising a planar surface, than with wire. The invention also proposes a shim in the form of a V allowing the extraction of heat from the strip windings.

To this end, the subject of the invention is a rotor of a rotating electrical machine comprising:
- a plurality of poles each extending on a first axis that is radial with respect to the rotor and on a second axis parallel to the rotor with respect to the rotor, each pole comprising a pole body,
- a rotor winding for each pole, positioned against the body of the pole, the rotor winding taking the form of a strip extending over the length of said pole body on the radial first axis wound against the pole body,
- a plurality of closure shims, a closure shim of the plurality of closure shims being in contact with a rotor winding associated with a pole body, said closure shim being configured to exert a pressure on said rotor winding towards said pole body.

According to one aspect of the invention, the rotor winding is an oxidized aluminium strip.

According to one aspect of the invention, the rotor winding is a copper strip.

According to one aspect of the invention, the closure shim is a V extending on two secant planes of which a first plane of the two planes is in contact with the rotor winding of a first pole of the plurality of poles and of which a second plane of the two planes is in contact with the rotor winding of a second pole of the plurality of poles, the second pole being adjacent to the first pole.

According to one aspect of the invention, the V comprises an inlet aperture positioned at a first end of the V along the second axis, a first discharge aperture positioned at a second end of the V along the second axis, different from the first end, and a second discharge aperture positioned at the second end of the V along the second axis, the inlet aperture being linked to the first discharge aperture and to the second discharge aperture by a duct network.

According to one aspect of the invention, the duct network successively takes a straight form and a bent form.

The invention also deals with a rotating electrical machine, comprising the rotor, the rotor winding of the pole being linked electrically to an electrical power source, via electrical links, the electrical links being obtained by cold pressure welding, by friction stir welding, pressure brazing or pressure welding, the electrical power source being made of copper.

BRIEF DESCRIPTION OF THE DRAWINGS

The invention will be better understood and other advantages will become apparent on reading the detailed description of an embodiment given by way of example, the description being illustrated by the attached drawing in which.

In the interests of clarity, the same elements will bear the same references in the various figures.

DETAILED DESCRIPTION

Figure 1:
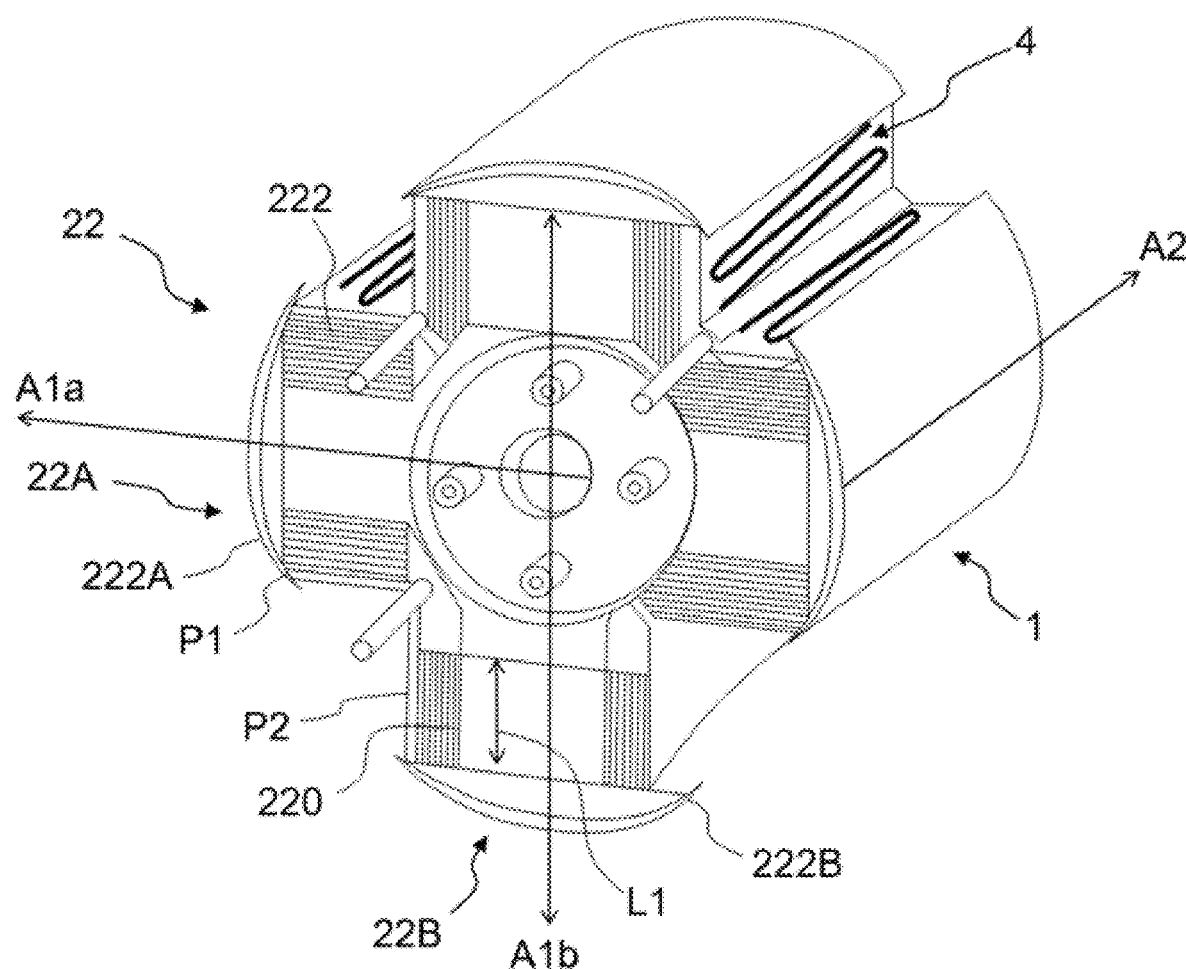
FIG. 1 represents a cross-sectional schematic view of a rotor of a rotating electrical machine according to the invention.

FIG. 1 represents a cross-sectional schematic view of a rotor 1 of a rotating electrical machine according to the invention. The rotor 1 of a rotating electrical machine comprises a plurality of poles 22, and preferentially four poles 22, each extending on a first axis A1 that is radial with respect to the rotor 1, and more specifically with respect to an axis of rotation of the rotor 1, and on a second axis A2 parallel to the rotor 1 with respect to the rotor 1, and more specifically with respect to the axis of rotation of the rotor 1. In other words, the pole 22A extends on the axis A1*a* and the pole 22B extends on the axis A1*b*. Each pole 22 comprises a pole body 220 extending on the first axis A1 and the second axis A2, and a rotor winding 222 for each pole 22, positioned against the body 220 of the pole 22. The rotor winding 222 takes the form of a strip extending over the length L of said pole body 220 on the radial first axis A1 wound against the body 220 of the pole 22. For each rotor pole, the strip envelops the body 220 and is wound around the body forming a superpositioning of layers of strip around the body 220.

The rotor 1 also comprises a plurality of closure shims 4. A closure shim 4 of the plurality of closure shims is in contact with a rotor winding 222 associated with a pole body 220 and said closure shim 4 is configured to exert a pressure on said rotor winding 222 towards said pole body 220. The term "towards" means that the winding 222 is positioned bearing against the pole body 220 by the pressure action of the closure shim 4. This pressure action of the closure shim 4 can be exerted, preferentially at right angles with respect to the length of the pole body 220, that is to say at right angles with respect to the radial first axis A1 or on an axis having a component on an axis at right angles to the radial first axis A1 and at right angles to the second axis A2.

As stated previously, the winding 222 takes the form of a strip wound along the pole body 220 and thus using all the available volume around the body 220 of the pole 22, unlike the wire windings according to the prior art. Consequently, a strip winding 222 presents the advantage of being more compact than a conductive wire winding Indeed, the contact between two planar zones, namely two zones of the winding 222 of the strip, wound around one another, is perfect. By contrast, the contact between two wire zones of a wire winding according to the prior art is made only at a point of contact, then freeing up a volume that is inaccessible for the conductor and therefore inappropriate for the electrical induction.

Furthermore, as is known, heat is generated in the windings because of the ohmic losses linked to the electrical currents.

Now, the permanent contact between two layers of the strip winding 222 also presents the advantage of generating a perfect thermal bridge between the two layers, facilitating the thermal transfer and the extraction of heat to the outside. Conversely, the imperfect contact between the conductor wires of a winding according to the state of the art allows air, which is a thermal insulator, to occupy the volume available between each conductor wire, which is a brake to the thermal extraction from the winding according to the state of the art.

The rotor winding 222 is preferentially an oxidized aluminium strip. The oxidized aluminium strip presents the advantage of lightening the winding and therefore the pole 22 of the rotor, thus making it possible to increase the speed of rotation of the pole 22. Furthermore, the oxidation of the aluminium also represents an advantage by allowing the electrical insulation between the different layers of the strip of the winding 222 while reducing the distance between each layer of the strip of the winding 222, favouring the thermal bridge between the layers of the strip of the winding 222. Indeed, the anodic oxidation of the strip makes it possible to wind with a very small thickness of the layers of insulation, approximately 8 μm, optimizing the filling of the winding by the winding 222 and the heat exchange.

As a variant, the rotor winding 222 is a copper strip. A copper strip then presents the advantage of being a better electrical conductor compared to the oxidized aluminium strip, but also presents the drawback of being heavier, limiting the rotation speed of the rotor.

As stated previously, the rotor 1 comprises a plurality of closure shims 4. More specifically, the rotor 1 comprises a necessary number of closure shims 4 to keep each winding 222 against the pole body 220 affiliated with said winding 222. Each closure shim 4 then has a form favouring the pressure bearing on the winding 222 in contact with said closure shim 4 against the pole body 220 around which the winding 222 is located. Consequently, the closure shim 4 can have a planar form extending over the length L of the pole body 220 and over the length of the winding 222 on the first axis A1 and on the second axis A2.

Figure 2:
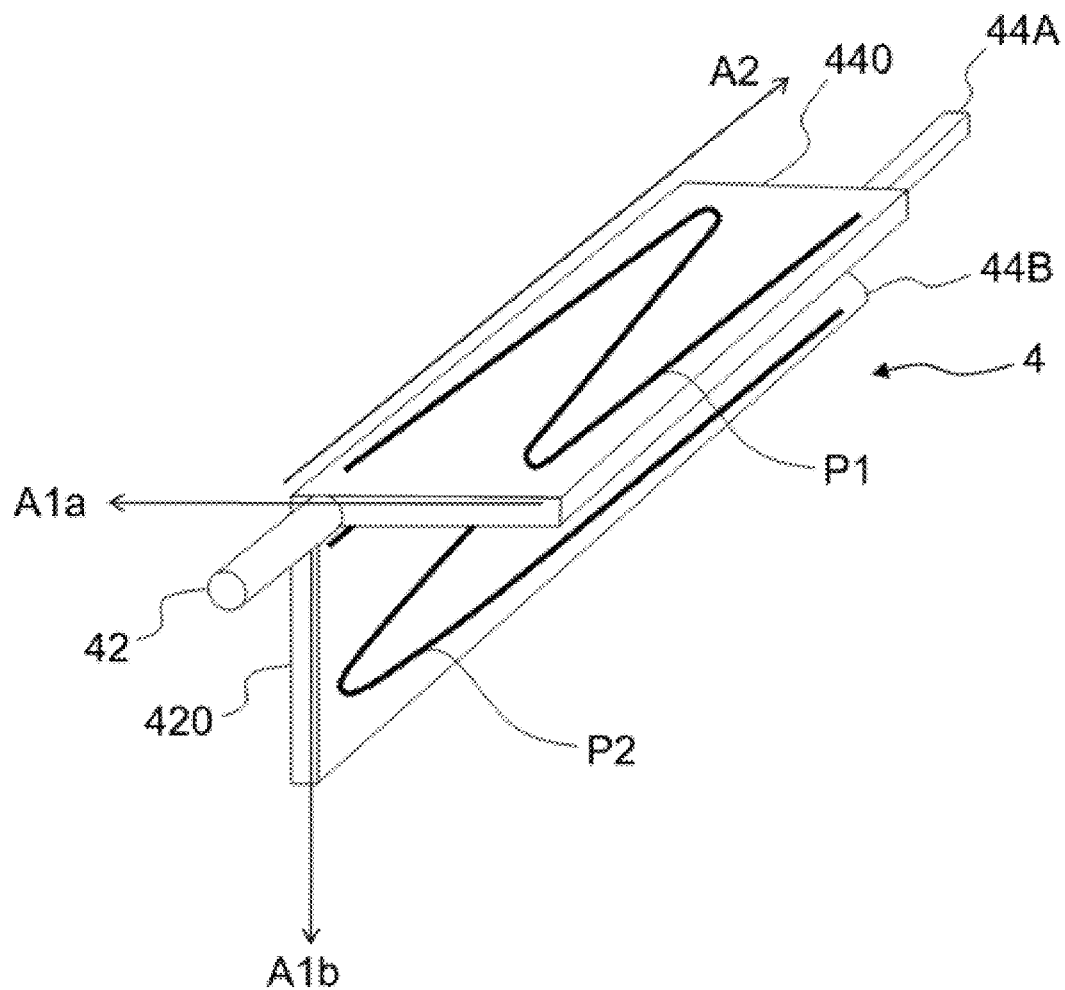
FIG. 2 represents a schematic view of a closure shim according to the invention.

According to a preferential variant, the rotor 1 has as many closure shims 4 as poles 22. Thus, a rotor 1 having four poles comprises four closure shims 4. Each closure shim 4 is in contact with two poles 22 that are adjacent to one another so as to induce a pressure on each winding 222 towards each body 220 of a pole 22. For this, the closure shim 4 takes the form of a V, as represented in FIG. 2, extending on two secant planes of which a first plane P1 of the two planes, which extends parallel to the first axis (A1*a* for the pole 22A) and parallel to the second axis A2, is in contact with the rotor winding 222A of a first pole 22A of the plurality of poles 22 and of which a second plane P2 of the two planes, which extends also parallel to the first axis (A1*b* for the contact with the pole 22B) and parallel to the second axis A2, is in contact with the rotor winding 222B of a second pole 22B of the plurality of poles 22, the second pole 22B being adjacent to the first pole 22A, as represented in FIG. 1.

This disposition presents the advantage of reducing the number of closure shims 4 and therefore reducing the overall weight of the closure shims 4 on the rotor 1.

Furthermore, any form of the closure shim 4 that makes it possible to induce a pressure on the windings 222 towards two bodies 220 of adjacent poles 22 can be taken into account. As an example, a closure shim of triangular form can be considered if two faces of the closure shim are in contact with two windings of two adjacent poles 22.

Hereinafter in the description, the closure shim 4 is likened to a V 4.

The closure shim 4 is obtained in a material allowing a good conduction of heat in order to induce a good extraction of the heat from the windings 222. As an indicative example, the closure shim is obtained in a metallic material.

The use of a V 4 extending on two distinct planes, the first plane P1 and the second plane P2 allowing a perfect contact between the winding 222 and one of the first plane P1 or second plane P2 presents the advantage of having a better cooling of the windings 222 because of the increased heat exchange surface compared to the potential heat exchange surface of the wires of a winding according to the state of the art.

Furthermore, the closure shim 4, represented in FIG. 2, comprises:
- an inlet aperture 42 positioned at a first end 420 of the closure shim 4 along the second axis A2,
- a first discharge aperture 44A positioned at a second end 440 of the closure shim 4 along the second axis A2, different from the first end 420,
- and a second discharge aperture 44B positioned at the second end 440 of the closure shim 4 along the second axis A2, so as to allow a coolant to pass through the closure shim 4 from the inlet aperture 42 to the first discharge aperture 44A or to the second discharge aperture 44B and facilitate the heat exchange between the winding 222 and the coolant passing through the closure shim 4. As an indicative example, the coolant is a heat-transfer fluid, for example oil. Nevertheless, any liquid promoting the thermal extraction and therefore having good thermal characteristics can be a coolant.

Figure 3:
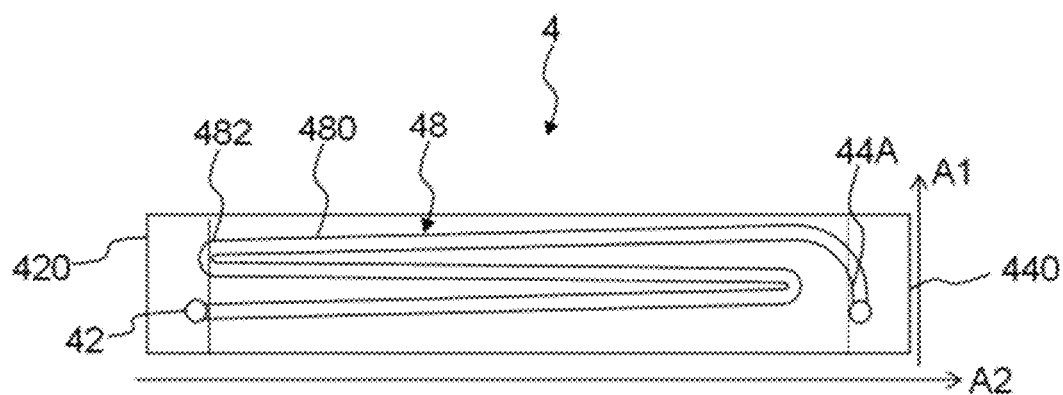
FIG. 3 represents a schematic view of the internal structure of the closure shim of FIG. 2.

The inlet aperture 42 is linked to the first discharge aperture 44A and to the second discharge aperture 44B by a duct network 48, represented in FIG. 3. The duct network 48, which is included in the closure shim 4, therefore makes it possible to circulate the coolant in the closure shim 4.

Furthermore, the inlet aperture 42 can be positioned randomly at the first end 420 of the closure shim 4. Thus, the inlet aperture 42 is in contact with the first plane P1 of the two planes. According to a variant, the inlet aperture 42 is in contact with the second plane P2 of the two planes. According to another, preferential variant represented in FIG. 2, the inlet aperture 42 is in contact with the two planes P1 and P2. The first discharge aperture 44A can be positioned randomly at the second end 440 and is, for its part, in contact with the first plane P1. The second discharge aperture 44B can be positioned randomly at the second end 440 and is in contact with the second plane P2. According to a variant of the invention, the first discharge aperture 44A and the second discharge aperture 44B are merged at the second end 440.

According to a preferential variant of the invention, the first discharge aperture 44A is distinct from the second discharge aperture 44B.

According to a preferential aspect of the invention, the radial distance between the rotor 1 and the inlet aperture 42 is greater than the radial distance between the rotor 1 and the first discharge aperture 44A. Also, similarly, the radial distance between the rotor 1 and the inlet aperture 42 is greater than the radial distance between the rotor 1 and the second discharge aperture 44B.

Furthermore, the duct network 48 can successively take a straight form 480 and a bent form 482. The overall form of the duct network 48 can be likened to a serpentine form starting from the inlet aperture 42 and culminating either at the first discharge aperture 44A or at the second discharge aperture 44B. Furthermore, the straight form 480 is defined according to a slope α that is inclined with respect to the second axis A2. More specifically, the straight line defining the straight form 480 is secant to the second axis A2 according to an angle forming the slope α. In an indicative example, the slope α is between 1° and 3°. The duct network 48 thus takes the form of a channel included inside the closure shim 4 extending between the first discharge aperture 44A and the second discharge aperture 44B. The succession of straight and bend and the slope of each straight thus offers the advantage of making it possible to optimize the flow of the coolant inside, so as to have a significant flow rate in the duct network 48. Consequently, the thermal extraction is thereby enhanced. It is also possible to consider each straight form 480 being defined by a specific and different slope α so as to further optimize the flow.

Thus, the positioning of the inlet aperture 42 in radial proximity to the rotor coupled with the radial distance from the first discharge aperture 44A and from the second discharge aperture 44B, the presence of the slope α, associated with the centrifugal force due to the rotation of the rotor 1, makes it possible to enhance the circulation, by increasing the flow rate, of the coolant in the closure shim 4. Consequently, with a significant flow rate of the coolant in the closure shim 4, this configuration makes it possible to increase the heat extraction capability of the V 4, and, particularly of the coolant passing through the closure shim 4.

Figure 4:
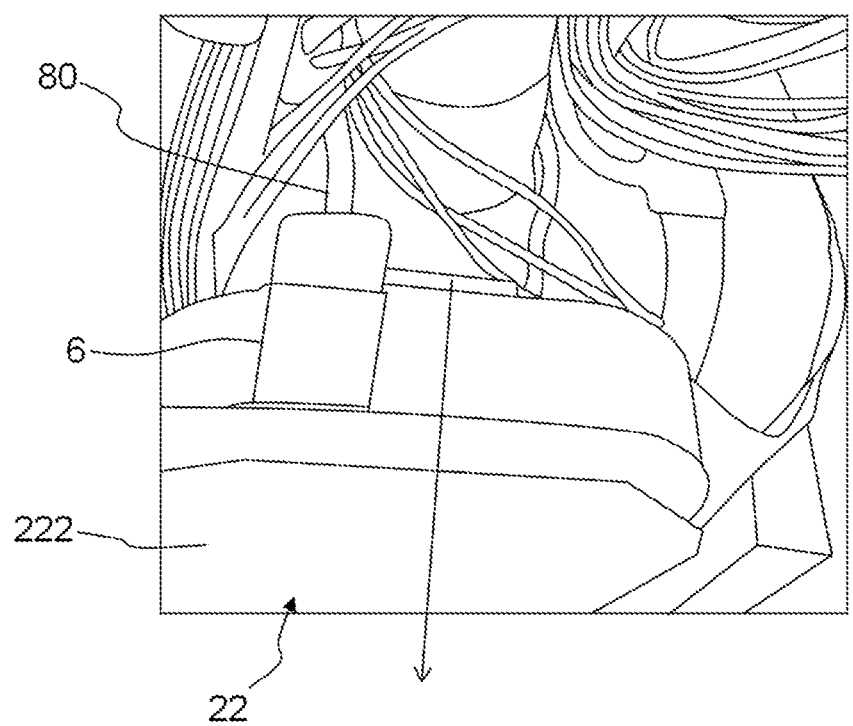
FIG. 4 represents an electrical connection between a winding of the pole and an electrical power source of a rotating electrical machine.

FIG. 4 represents an electrical link 6 between a winding 222 of the pole 22 and an electrical power source 80 of the rotating electrical machine. In fact, the rotor winding 222 of the pole 22 is then linked electrically to the electrical power source 80 via electrical links 6. Generally, the electrical power source 80 is made of copper. Now, the winding 222 is, according to a variant stated previously, a strip of oxidized aluminium. And the electrical connection between a component made of copper and a component made of oxidized aluminium is relatively poor.

Consequently, in order to allow a good electrical connection between the electrical power source 80 and the winding 222, the electrical links 6 are obtained by cold pressure welding, friction stir welding, pressure brazing or pressure welding. As a preferential example, cold pressure welding is the method of connection between the electrical links 6 and the winding 222 ensuring an electrical continuity between the winding 222 made of aluminium strip and the electrical power source 80 made of copper. Furthermore, this connection principle, namely the cold pressure welding, is economical. According to this connection method, the electrical power source 80 is brazed and then crimped with the winding 222 made of oxidized aluminium strip.

The invention claimed is:
1. A rotor of a rotating electrical machine comprising:
a plurality of poles each extending on a first axis that is radial with respect to an axis of rotation of the rotor and on a second axis parallel to the rotor with respect to the axis of rotation of the rotor, each pole comprising a pole body,
a rotor winding for each pole, positioned against the body of the pole, the rotor winding taking the form of a strip extending over the length (L) of said pole body on the radial first axis wound against the pole body,
a plurality of closure shims, a closure shim of the plurality of closure shims being in contact with a rotor winding associated with a pole body, said closure shim being configured to exert a pressure on said rotor winding towards said pole body,
the closure shim comprising an inlet aperture positioned at a first end of the closure shim along the second axis, a first discharge aperture positioned at a second end of the closure shim along the second axis, different from the first end, and a second discharge aperture positioned at the second end of the closure shim along the second axis, the inlet aperture being linked to the first discharge aperture and to the second discharge aperture by a duct network intended to circulate a coolant in the closure shim, the duct network comprises a channel inside the closure shim successively taking a straight form and a bent form.

2. The rotor of a rotating electrical machine according to claim 1, wherein the rotor winding is an oxidized aluminium strip.

3. The rotor of a rotating electrical machine according to claim 1, wherein the rotor winding is a copper strip.

4. The rotor of a rotating electrical machine according to claim 1, wherein the closure shim is a V extending on two secant planes of which a first plane of the two planes is in contact with the rotor winding of a first pole of the plurality of poles and of which a second plane of the two planes is in contact with the rotor winding of a second pole of the plurality of poles, the second pole being adjacent to the first pole.

5. A rotating electrical machine, comprising the rotor according to claim 1, the rotor winding of the pole being linked electrically to an electrical power source, via electrical links, the electrical links being obtained by cold pressure welding, friction stir welding, pressure brazing or pressure welding, the electrical power source being made of copper.

* * * * *